(12) United States Patent
Balabolin et al.

(10) Patent No.: US 12,490,749 B2
(45) Date of Patent: Dec. 9, 2025

(54) DEVICE AND METHOD FOR CONTROLLABLE GROWTH OF CRYSTALS IN A PROCESS OF FREEZING

(71) Applicant: ACOUSTIC EXTRA FREEZING OY, Helsinki (FI)

(72) Inventors: Dmitry Balabolin, Helsinki (FI); Andrey Pechurin, Helsinki (FI); Igor Klimashevsky, Helsinki (FI); Anna Makarova, Helsinki (FI)

(73) Assignee: ACOUSTIC EXTRA FREEZING OY, Helsinki (FI)

( * ) Notice: Subject to any disclaimer, the term of this patent is extended or adjusted under 35 U.S.C. 154(b) by 677 days.

(21) Appl. No.: 17/794,430

(22) PCT Filed: Jan. 22, 2021

(86) PCT No.: PCT/FI2021/050042
§ 371 (c)(1),
(2) Date: Jul. 21, 2022

(87) PCT Pub. No.: WO2021/148721
PCT Pub. Date: Jul. 29, 2021

(65) Prior Publication Data
US 2023/0099623 A1    Mar. 30, 2023

(30) Foreign Application Priority Data
Jan. 23, 2020    (FI) ..................... 20205072

(51) Int. Cl.
*A23B 2/80*    (2025.01)
*A01N 1/168*   (2025.01)

(52) U.S. Cl.
CPC ............ *A23B 2/80* (2025.01); *A01N 1/168* (2025.01); *A23V 2002/00* (2013.01)

(58) Field of Classification Search
CPC .... A23B 2/80; A23B 2/60; A23B 4/06; A23B 2/50; A01N 1/168; A01N 1/162;
(Continued)

(56) References Cited

U.S. PATENT DOCUMENTS

| 3,876,373 A * | 4/1975 | Glyptis ............ A61L 2/14 422/23 |
| 4,091,119 A | 5/1978 | Bach |

(Continued)

FOREIGN PATENT DOCUMENTS

| CN | 107965960 | 11/2019 |
| EP | 1 447 632 | 8/2004 |

(Continued)

OTHER PUBLICATIONS

International Search Report dated Apr. 28, 2021, for PCT/FI2021/050042, 4 pp.
(Continued)

*Primary Examiner* — Thienvu V Tran
*Assistant Examiner* — Muaamar Qahtan Al-Taweel
(74) *Attorney, Agent, or Firm* — Bardmesser Law Group

(57) ABSTRACT

A device for controllable growth of ice crystals inside an organic object during freezing, the device comprising at least one transducer, a control unit, a power supply and a modulator, wherein the control unit causes a plurality of types of magnetic fields to be emitted, by the at least one transducer, in a cyclical manner, and the control unit determines, for each type of magnetic field comprised in the plurality of types of magnetic fields, a carrier frequency, a modulation frequency, modulation boundaries and duty cycle, and sets them by utilizing the signal generator and the power supply; and wherein a strength of the plurality of the types of the magnetic fields is determined by adjusting an output voltage provided by the power supply.

21 Claims, 5 Drawing Sheets

(58) Field of Classification Search
CPC ... A23V 2002/00; F25D 17/042; F25D 13/00; F25B 21/00
See application file for complete search history.

(56) References Cited

U.S. PATENT DOCUMENTS

| | | | | |
|---|---|---|---|---|
| 4,462,215 | A | * | 7/1984 | Kuraoka ................. A01N 1/143 |
| | | | | 62/51.1 |
| 5,084,377 | A | * | 1/1992 | Rowan ..................... A01N 1/10 |
| | | | | 435/1.3 |
| 5,156,003 | A | * | 10/1992 | Yoshiro .................. F25B 21/00 |
| | | | | 505/891 |
| 5,157,930 | A | * | 10/1992 | McGhee ................... F25D 3/06 |
| | | | | 62/306 |
| 6,347,525 | B2 | * | 2/2002 | Cosman .................. F25D 3/102 |
| | | | | 62/65 |
| 6,461,289 | B1 | | 10/2002 | Muntermann |
| 2002/0052634 | A1 | | 5/2002 | March |
| 2006/0112699 | A1 | | 6/2006 | Sato et al. |
| 2016/0302457 | A1 | | 10/2016 | Jun et al. |

FOREIGN PATENT DOCUMENTS

| | | |
|---|---|---|
| JP | 2002/333250 | 11/2002 |
| JP | 2005/291525 | 10/2005 |
| JP | 2009/47422 | 3/2009 |
| JP | 2011-103775 | 6/2011 |
| WO | 2006/114813 | 11/2006 |

OTHER PUBLICATIONS

Written Opinion of the ISA dated Apr. 28, 2021, for PCT/FI2021/050042, 5 pp.
Finnish Search Report dated Sep. 2, 2020, for FI Application No. 20205072, 3 pp.
Mohsen Dalvi-Isfahan et al., "Review on the control of ice nucleation by ultrasound waves, electric and magnetic fields", Journal of Food Engineering, vol. 195, 2017, pp. 222-234.
Atsuko Kobayashi et al., "A ferromagnetic model for the action of electric and magnetic fields in cryopreservation", Cryobiology, vol. 68, 2014, pp. 163-165.

* cited by examiner

DEVICE AND METHOD FOR CONTROLLABLE GROWTH OF CRYSTALS IN A PROCESS OF FREEZING This application is the U.S. national phase of International Application No. PCT/FI2021/050042 filed Jan. 22, 2021, which designated the U.S. and claims priority to FI 20205072 filed Jan. 23, 2020, the entire contents of each of which are hereby incorporated by reference.

FIELD

The present invention relates to a device for a controllable growth of crystals inside organic objects for example food during freezing.

The present invention also relates to a method of influencing and controlling the nucleation and growth of crystals during the process of freezing food, biological specimens, aqueous liquids, and colloids.

BACKGROUND

Freezing is widely utilized to prolong the lifetime of for example food products. During freezing, liquid becomes solid and most liquids freeze by crystallization. While freezing, the structure of the product changes such that once the product is defrosted, it is different compared to the form it had before freezing.

Some freezing devices and methods operate under the influence of a static magnetic field (for example, Earth's magnetic field) and a static electric field in combination with an oscillating electric field and/or an oscillating magnetic field.

Some published patent applications or patents disclose embodiments that include permanent magnets and magnetic coils combined with some other devices. However, the mechanisms explaining the expected improvements, according to Kobayashi and Kirschvink: *A ferromagnetic model for the action of electric and magnetic fields in cryopreservation*, Cryobiology; Volume 68, Issue 2 (2014), in some cases "do not agree with basic biophysics".

Moreover, some freezing devices and methods do not solve for example the following problems deteriorating quality of frozen products: needle-shape ice crystals that are formed along Earth's magnetic field force lines; exponential growth of large crystals that may pierce and destroy the walls of cells; expulsion of ions of salts outside the cells that cause dehydration of proteins; the sublimation of ice causes occurrence of microscopic holes inside a frozen product resulting in the oxidation of lipids.

When an electric field is applied to an object during a freezing process, water molecules and oxygen molecules are given electrons, turning into electron-added water (H2Oe) or superoxide anion (O2−) and producing hydroxyl radicals that may destroy the cell membranes. The electric field may be caused even by frictions of cold air flows inside a freezing chamber.

BRIEF DESCRIPTION

An object of the present invention is to provide means for controlling growth of ice crystals in an organic object during freezing.

The objects of the invention are achieved by a device and a method for controlling the growth of ice crystals during freezing.

According to another aspect, there is provided a device for controllable growth of ice crystals inside an organic object during freezing, the device comprising at least one transducer, a control unit, a power supply and a modulator, wherein the control unit causes a plurality of types of magnetic fields to be emitted, by the at least one transducer, in a cyclical manner, and the control unit determines, for each type of magnetic field comprised in the plurality of types of magnetic fields, a carrier frequency, a modulation frequency, modulation boundaries and duty cycle, and sets them by utilizing the signal generator and the power supply; and wherein a strength of the plurality of the types of the magnetic fields is determined by adjusting an output voltage provided by the power supply.

According to another aspect there is provided a system comprising a chamber and further comprising, or combined with, the above-mentioned device.

According to an aspect, there is provided a method for influencing and controlling the nucleation and growth of crystals during the process of freezing an organic object, the organic object comprising at least one of: food, biological specimens, aqueous liquids, and/or colloids, wherein the method comprises placing the organic object to the chamber of the above-mentioned system.

LIST OF DRAWINGS

In the following, the invention will be described in greater detail with reference to the embodiments and the accompanying drawings, in which FIG. 1 illustrates an exemplary embodiment of the device.

DESCRIPTION

Figure 1:
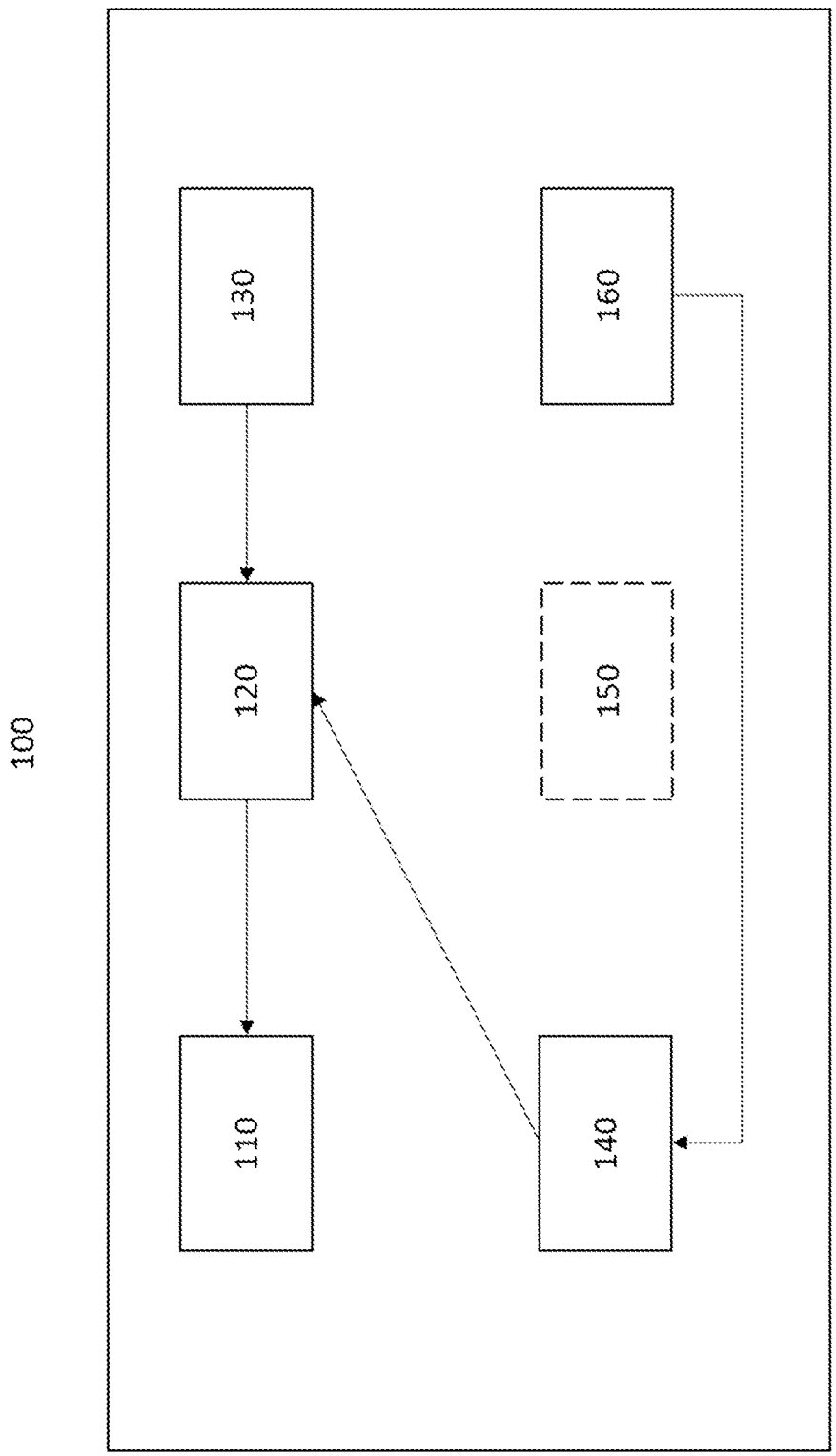

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Organic objects may be subjected to freezing for various reasons. Yet, most objects may experience changes in their structure when freezing. Such changes may not be desirable. For example, if the object is a food product such as a cucumber or tomato for example, the structure of the object may change such that it is not pleasant for eating anymore. This phenomenon may be due to ice crystal formation within the organic object, changing its structure and chemical composition. Ice crystals may also be understood as crystallization process in which liquid freeze such that in its solid form the atoms and/or molecules form a structure known as a crystal. An ice crystal may be understood as a form of such crystal. Crystallization process may comprise two steps. The first step may be nucleation which comprises an appearance of a crystalline phase from a supercooled liquid. Supercooling may be understood as liquid being cooled to a temperature below its freezing point without the liquid becoming solid. The second step may be crystal growth in which there is increase in the size of particles and which leads to a crystal state.

Organic objects to be frozen have cells and the cells may have different structures. A structure of a cell may comprise for example a nucleus, cytoplasm, and cell membranes. A cell's substance may be a colloid system containing compound organic matters such as proteins, fats, and carbohydrates, as well as water and inorganic salts. Cytoplasm may constitute the most part of a cell's substance. When the organic object is subjected to freezing, ice crystal formation may occur within the organic object.

If a colloid solution is subjected to a permanent magnetic field and refrigeration to the crystallization temperature, crystals generated due to the crystallization process may become needle-shaped. An example of a permanent magnetic field is the magnetic field of the Earth. In general, a permanent magnetic field may be understood as a magnetic field that remains constant. The crystals may further be formed along magnetic field force lines. Thus, crystals that have gained a larger surface area due to for example accidental entropy fluctuations, may gain a growth rate proportionally higher than crystals with a smaller surface area. This may result in exponential growth of larger crystals compared to smaller ones. For example, a high freezing speed may enable producing a larger number of crystal seeds. A crystal seed may be understood as a small crystal that may be grown into a larger crystal. However, fluctuations causing advanced development of some of the crystal seeds may result in significant nonuniformity of their size distribution. Some of the crystals may get radical advantages in their growth, and thereby form long needles, while a vast majority of crystal seeds fall behind with their total mass remaining rather insignificant. In such a case, it would be beneficial to be able to prevent the growth of larger crystals.

Various factors may affect the ice crystal formation within an organic object. For example, the following five ice crystal growth factors may cause, individually or combined in any combination, changes in the structure of the organic objects during their freezing:

1. The permanent magnetic field of the Earth, or another permanent magnetic field that is present during the freezing process, may result in predominance of crystals shaped as ice needles growing in the direction of the force lines of the permanent magnetic field.
2. A crystal's growth rate may depend on its surface area. Respectively, the growth rates of crystals that are incidentally ahead in their growth may increase exponentially, which may result in the bulk of the frozen water mass concentrating mostly in the largest crystals—that is, crystal needles. In the process of growth, large crystals may pierce through the walls of one or more cells thereby destroying them. Then, with their parallel facets matched in spaces, different crystals may grow into one large crystal comprising a multitude of interlocked crystal needles. As the cell walls are pierced through, during defrosting the cellular fluid of the destroyed cells may flow out, which results in losses of the weight and quality organic object that was subjected to freezing.
3. The process of freezing of intracellular water and water outside the cells involves expulsion of foreign matter, such as ions of salts and other dissolved substances, from the crystallization front. Therefore, in the course of freezing, ice may be formed comprising clear distilled water. Meanwhile, the remaining part of unfrozen water may become a saturated salt solution. Consequently, the saturated salt solution, both inside and between the cells, may irreversibly dehydrate organic molecules of the organic object existing in the form of hydrates. Therefore, the saturated salt solution may lead to dehydration as it has highly hydrophilic behaviour.
4. During storage of a frozen organic object, ice evaporation may take place causing the frozen organic object to lose weight. As a permanent magnetic field may cause the crystals form needles, which pierce the cell walls and coalesce into one porous crystal of the size of the object to be frozen, the sublimation of such ice may result in occurrence of microscopic holes in the mass of the frozen organic object, extending as micro channels up to the centre of the frozen organic object. Oxygen may then penetrate into such holes, which results in oxidation and spoilage of the frozen organic object. This process may be suppressed by covering objects with an ice crust, or glaze. Yet, the thin layer of glaze is brittle and not elastic. During relocation, sorting, delivery, and other handling of the frozen organic object, the glaze may crack thereby enabling oxygen to penetrate inside and oxidize the frozen organic object.
5. When an electric field is applied to an object during a freezing process, water molecules and oxygen molecules are given electrons, turning into electron-added water (H2Oe) or superoxide anion (O2−) and producing hydroxyl radicals that may destroy the cell membranes. It is to be noted that also frictions of cold air flows, that are inside a freezing chamber, may cause the electric field.

An organic object that may be subjected to ice crystal growth during freezing may be for example a food product, which may also be understood as a beverage, and one or more of their ingredients; a plant and its fruit; a biological fluid; a food product comprising live bacteria; organs and tissues of an animal or a human; a living cell of an animal, a vegetable, bacterial, or fungal origin; microbiota; and aqueous and water-alcohol process fluids. It is desirable that during freezing and defrosting the chemical and physical properties of an organic object may be preserved. Such preserving may be achieved for example by controlling ice crystal formation onside the organic object that is to be frozen.

Alternating magnetic waves generate mechanical elastic waves within an organic object by exciting mechanical oscillation of ions. Such alternating magnetic field causes generation of mechanical waves in the mass of an organic object that is to be frozen.

Permanent magnetic field in an object to be frozen may be caused by permanent magnets or devices comprising permanent magnets such as electric motors for example, and the permanent magnetic field of the Earth. To remove the influence of permanent magnetic fields, a power of the alternating magnetic field must be at least five times higher.

Due to the mechanical oscillations generated by the alternating pulse magnetic field inside the object to be frozen, the transition of water in its liquid phase to a supercooled state may be prevented, thereby enabling the freezing process to run in a controllable and gradual way, being cyclically repeated from the surface to the centre of the organic object to be frozen. This may be irrespective of the temperature of a refrigerant in a freezing device. The use of a magnetic field with a rotating effect may result in displacement of ions within the liquid water range, and in the generation of a local current loop—that is, motion of charged particles, which are subjected to the Ettingshausen effect, which gives rise to a temperature gradient, the intensity of which may in turn be regulated by the magnetic field intensity amplitude. This may enable changing the temperature gradient level, and thus the quantity of salt ions drawn into a crystal through the crystallization front or pushed out of it.

Therefore, it is beneficial to have a device that generates an alternating magnetic field that causes mechanical elastic waves in the object. The device may thereby prevent influence of electric and static magnetic fields to the growing crystals.

FIG. 1 illustrates an exemplary embodiment of a device 100 that may be used for a controllable freezing of an organic object. The device comprises a Control Unit, CU, 140, which may be a digital control unit. The CU 140 may further comprise, or be connected to, a power supply 130, which may be adjustable and which is supplied from a DC or AC source, with a modulator 120, which may be a built-in modulator, and a transducer 110. The power supply 130 may provide constant and/or pulsating voltage with a given frequency. The given frequency may be determined by the CU 140. It is to be noted that in some alternative exemplary embodiments, the number of transducers may be greater than one. The CU 140 may further comprise or be connected to a digital signal generator. The CU 140 may be configured to connect to a wired or wireless network. The CU 140 may receive input via the wired or wireless network and, additionally or alternatively, from a control panel 160 that comprises a user interface.

The transducer 110, in this exemplary embodiment, is connected to the CU 140 with electric wires for signal transmission.

The transducer 110 may be of any closed contour shape, such as rectangular, polygonal or round, or shaped as several rectangles or disks put one into another and arranged in a 3D space so as to provide an equal amplitude of magnetic and magnetic fields with a preset accuracy for the entire volume of the freezing chamber where the products to be frozen are placed. In other words, there may be a transducer that comprises one or more other transducers within it. In some exemplary embodiments, there may be one, two, or more windings of copper, aluminium, or silver wire having 10 or more turns and connected to the CU 140 arranged inside the transducer 110. The transducer 110 in this exemplary embodiment may be manufactured using any non-magnetic material. In some exemplary embodiments, the transducer 110 may have a mobile design to facilitate loading and maintenance.

The amplitude of signals transmitted by the CU 140 may be determined by utilizing one or more algorithms to calculate fields superposition based on the size and position of the transducer 110 that is used for generating fields of a similar power with a predetermined accuracy and an intensity, which in this exemplary embodiment, may be five to ten times higher than the permanent magnetic field intensity measured at the site in which the device 100 is located at. The algorithms may be executing by a computing apparatus that may be comprised in or connected to the device 100.

In this exemplary embodiment, to generate a plurality of crystal seeds during freezing within the organic object, the CU 110 may cause the transducer 110 to emit an alternating pulse magnetic field of an infrasonic, sonic, and ultrasonic frequency range of 0.1 Hz to 12 MHz, which interacts with ions of salts and organic molecules comprising ions of metals, and do not interact with molecules of water, since they are both diamagnetic and dielectric. This may cause generation of ice crystal seeds with ions inside thereby reducing the saturation level of the salt solution formed when at least some of the water has already taken a crystalline form during freezing.

A magnetic field with a rotating effect may be produced by an alternating magnetic field or by a pseudo-rotating magnetic field. If an alternating magnetic field is used, the field's amplitude is more important than the field's vector direction for generating energy fluctuation. To remove the influence of the permanent magnetic field of the Earth (or other permanent magnetic fields), in this exemplary embodiment, the CU 140 emits an alternating magnetic field with an amplitude exceeding the amplitude of the permanent magnetic field at least five times. It is to be noted that the size of the permanent magnetic field to be removed depends on the presence of iron ore or other magnetic anomalies, large metallic magnetized objects, and/or permanent magnets nearby. The pseudo-rotation of the magnetic field may be driven, in this exemplary embodiment, by frequency modulation of a pulse width signal. The modulation frequency may depend on whether the organic object moves during freezing, and if it does, how fast. For example, if the organic object moves during freezing, the emission power required may be 25 or more percent higher than for immobile objects. The carrier frequency may be in the range of 1 kHz to 12 MHz. The modulation frequency may be in the range of 0.1 to 80,000 Hz. In some exemplary embodiments, the modulation frequency may be selected for different types of organic objects experimentally as a frequency, at which the lowest weight losses and the lowest nutrient composition changes are observed during freezing and subsequent defrosting.

An alternating modulated magnetic field may cause an effect that is the same or similar to a rotating field for magnetic dipoles due to their own final mass and their inertia smoothing the pulse modulation effect. The above-described modulation enables generating an alternating pulse magnetic field that will act equivalent to a rotating field, using the mechanical "slipping" of ions and ion-containing molecules moving in the direction of the magnetic field force lines during rotation. An impulse magnetic field is digital.

In general, to create a magnetic field with a rotation effect, a shift of signal phases on different transducers may also be used. This may be alike to signal phase shift in phased antenna arrays used in aviation. Even within the limits of effect of one transducer, without mechanical rotation of transducers and mechanical rotation of an organic object to be frozen, the magnetic field with a rotation effect is achieved.

The use of a pseudo-rotating magnetic field results in displacement of ions within the liquid water range, and in the generation of a local current loop—that is, motion of charged particles. They are subjected to the Ettingshausen effect, which gives rise to a temperature gradient, whose intensity is in turn regulated by a power of the magnetic field. This enables changing the temperature gradient level, and thus the quantity of salt ions drawn into a crystal through the crystallization front or pushed out of it.

A magnetic field may be considered to be of a certain type. Thus, a magnetic field, such as a magnetic field with a rotating effect, may be certain type of a magnetic field. For example, the type may be one of the following: an alternating bidirectional magnetic field, an alternating unidirectional magnetic field or a variable pseudo-rotating magnetic field with pulse width modulation. The CU 140 may cause the transducer 110 to emit a plurality of types of magnetic fields in a cyclical manner. In other words, cyclically changing the type of magnetic field to be emitted. The order may be pre-determined. The CU may for example comprise a memory, that may be energy independent, that may store the pre-determined order and/or one or more programs that define a pre-determined order for cyclically emitting different types of magnetic fields using the transducer 110. It is to be noted that in some alternative exemplary embodiments, there may be more than one transducer. It is also to be noted that in some exemplary embodiments there may also be more than one control unit, more than one power supply, and/or more than one modulator.

Considering the effect of generation of crystal seeds from ions, the overall quantity of foreign matter in the liquid phase becomes less than in the solid phase, and the total salinity decreases by the end of the freezing process. This may increase the possibility to additionally bind the water, which does not contribute to ice generation any more.

To prevent unlimited growth of crystals, the CU 140 may use transducers to emit an alternating pulse magnetic field interacting with magnetic dipoles of the organic object, causing them to make mechanical oscillations. As the ice crystals grow, their length approaches the length of the generated mechanical wave. The needle-shaped ice crystals are brittle. The bending strength of polystyrene for example is 50 MPa, while that of ice is a mere 2 to 4 MPa. They are subjected to mechanical bending and get broken thereby forming two or more smaller new crystals. Thus, the exponential size growth of the ice crystals leading in growth may be interrupted, and the recrystallization rate may be decreased. This ensures size distribution of crystals to be toward small-size and restricts their maximum size. For recrystallization of the crystals, their proper arrangement in space is required. Yet, that is prevented by a pseudo-rotating magnetic field created by the CU. Thus, the recrystallization level may be radically reduced for example at temperatures of −2 to −10° C.

In general, crystallization with a restricted maximum size of an ice crystal ensures structural integrity of the object to be frozen. An individual ice crystal may be surrounded by organic compounds, thus preventing coalescence of ice crystals into conglomerates, which makes impossible sublimation of ice from inner cavities of an organic object that is to be frozen and oxygen penetration into formed holes. Thus, oxidation may be prevented. As the salinity level, density, free water fraction, and chemical composition of the organic object may vary even within the limits of the piece being frozen, the exact value of the best frequencies may vary. To provide a necessary impact on physically and chemically variative parts of the organic object to be frozen, oscillations generated by the CU 140 may have a varying frequency.

In this exemplary embodiment, the frequency may be changed by frequency modulation of generated signals. The frequency range of the modulated signal of frequency modulation may be within the range of 1% to 30% of the carrier frequency of the signal. For an organic object with a constant inner structure, such as a potato, pitted avocado, pitted mango, or fish fillet, a narrower modulating signal frequency range may use, for example from 1% to 15% of the carrier frequency, or more. Due to the mechanical oscillations generated by the alternating magnetic field inside the object to be frozen, the transition of water in its liquid phase to a supercooled state is prevented.

It is to be noted that specific frequencies, powers, and modulation levels may depend on the type of the organic object to be frozen. A type of an organic objects may be for example, meat, fish, vegetable or any other type that is determined based on one or more characteristics of the organic object. Information regarding them may be therefore pre-determined and stored in a memory. The memory may be part of the CU 140 or it may be accessible by the CU 140.

In general, a control unit may be configured to control a signal generator and one or more power supplies such that it may cause setting of a carrier frequency, modulation frequency, modulation boundaries and a duty cycle for each type of magnetic field. Strength of a magnetic field may be set, i.e. determined, by adjusting the output voltage of the one or more power supplies. Each power supply unit may be connected to one or more modulators to each of which one or more transducers are connected. A device, such as the device 100, may be may be configured to cause a magnetic field of a given strength in the entire area of the freezing object without exceeding the specified deviation size (for example, no more than 10 percent) over an entire volume of space intended for a placement of freezing objects such as a freezing chamber. Same field amplitude provides same degree of exposure throughout the volume of the freezing chamber.

The device 100 illustrated in FIG. 1 may be used with various kinds of freezing equipment. For example, air freezing chambers with or without forced air movement, tunnel freezers with conveyor lines, freezers with spiral conveyors, contact freezers, both vertical and horizontal, and/or sets with a liquid agent or with a liquid agent with ice inclusions. The device 100 may comprise a Faraday shield 150, or a conducting structure that provides the same function as the Faraday shield, for example, a body of transducers 110, which may comprise an internal part with wounds of copper wire, and an external stainless steel body that comprises the wire.

Figure 2:
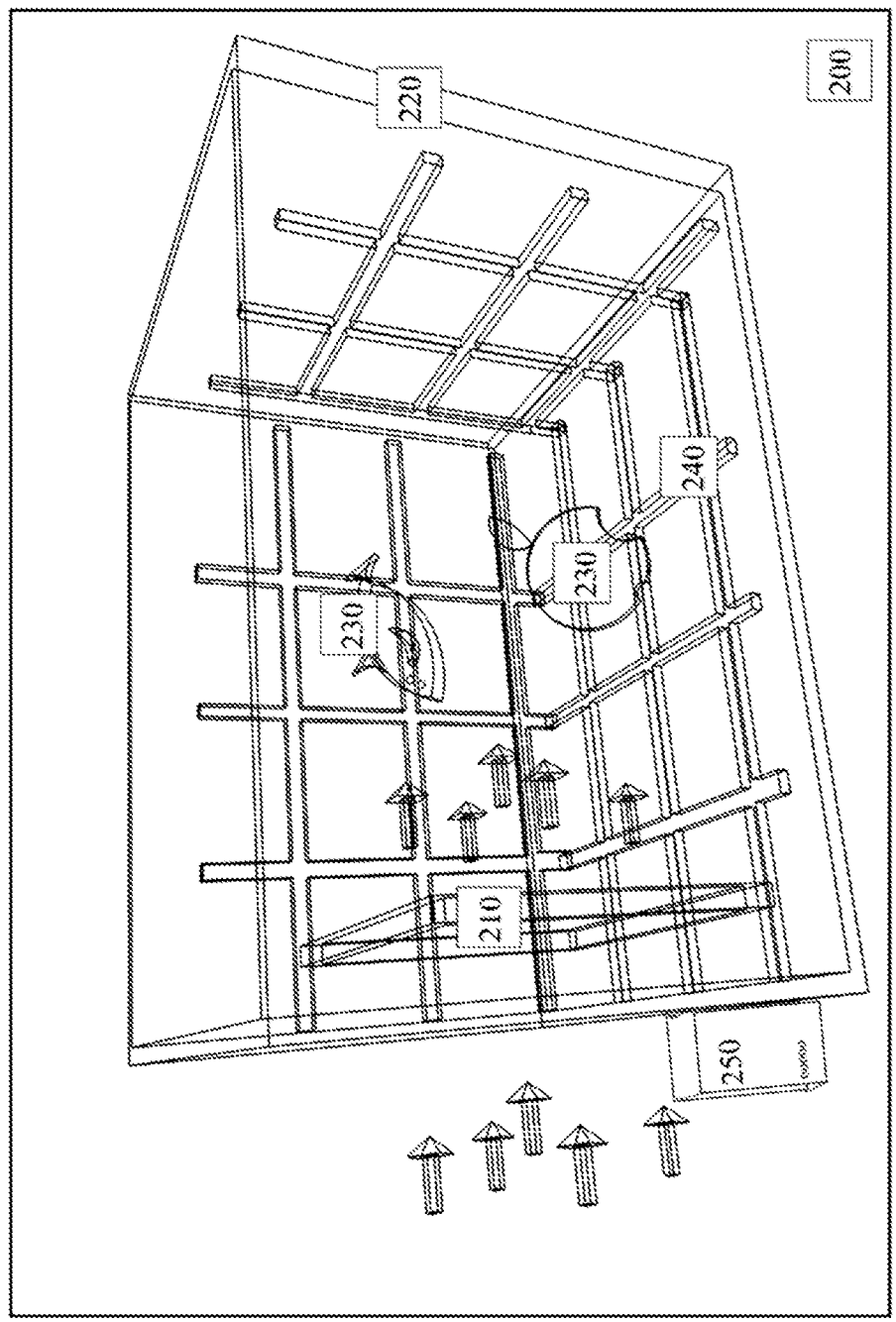
FIG. 2 illustrates an exemplary embodiment of the device with a freezing chamber.

FIG. 2 illustrates a system 200 that comprises a CU 250, a chamber used for freezing 220 and one or more organic objects to be frozen 230. In some exemplary embodiments, the system may comprise more than one chamber. The chamber 220 may be understood as a non-moveable freezing set to which the one or more organic objects 230 may be placed to for freezing. The chamber 220 may, in some exemplary embodiments, comprise a platform such as a conveyor, trolley, pallet or cooling surface, that provides means for moving the one or more organic objects to be frozen 230 within the chamber 220. This enables the objects to be moved into the chamber and out of it instead of statically placing them inside the chamber. The temperature of the objects that are to be moved into the chamber may be above 0 degrees Celsius.

The chamber 220 is cooled to a temperature below 0° C. The chamber 220 may be filled with air or liquid or having cooled surfaces that may be used such that they are in contact with the one or more organic objects 230. The CU 210 may comprise one or more transducers that fill the chamber's interior volume with an alternating magnetic field. In this exemplary embodiment, the magnetic field is emitted at a frequency of 0.1 Hz to 12 MHz with periodically varying power, frequency, and type of modulation, and with an amplitude of oscillation that is lower than the amplitude initiating the occurrence of dissolved gases caused by cavitation, but at least five times higher than the Earth's magnetic field at a place of location to prevent its influence on the formation of ice crystals depending on the geographical location and local extreme values of a permanent magnetic field. For each type of product that is to be frozen, there may be exact values of the parameters of magnetic field irradiation determined and selected individually by selecting such combinations of magnetic field parameters that for a particular type of object of freezing give the best quality results.

The freezing chamber may be, in some exemplary embodiments, enclosed by a Faraday shield to eliminate the harmful effects of the electric field causing the appearance of radicals in frozen objects. However, in some exemplary embodiments, the effect of a Faraday shield may be achieved by the freezing chamber having metallic walls, ceiling and a door. Also, in some exemplary embodiments, the Faraday shield is not needed if the device 100 has a metal surface or comprises means for draining electric charges.

Further, in this exemplary embodiment, all transducers are arranged inside a refrigerated volume of the chamber. The transducers may be made of food-grade stainless steel. The transducers may be rectangular or round multiple-turn solenoids with one or more windings of copper, aluminium, or silver wire in, for example, ten or more turns. The transducers may receive for emitting a signal generated by the CU 250. In this exemplary embodiment, the CU 250 comprises a controller unit, which may be a computing apparatus in some examples, a digital wave generator, digital DC sources, a control panel, and a digital modulator with at least one channel. The controller unit may comprise software comprising one or more radiation power calculation algorithms and data on the types of signals to be emitted for various types of organic objects to be frozen 230. Further, the refrigerated enclosure of the chamber may be manufactured so as not to arrange magnetic materials inside the working space of the system.

The transducers of the system illustrated in FIG. 2 may be arranged in the walls of the chamber. The transducers may be manufactured from any non-magnetic material. Yet, in some other exemplary embodiments, the transducers may be arranged outside the chamber. In yet some other exemplary embodiments, the transducers may be arranged both in the walls of the chamber and outside the chamber. Further, the transducers may be placed in line with the direction of the one of magnetic poles of the Earth. The control unit may then cause the transducers to emit an extra static magnetic field in opposite to the Earth magnetic field direction for its compensation. This may reduce common static field level inside the freezing chamber, providing less needed power of alternating magnetic field for saving energy.

It is to be noted that, in some exemplary embodiments, one or more of the transducers may have a mobile design to facilitate loading and maintenance. Additionally, or alternatively, the transducers may have a design in the form of smaller transducers inserted within a larger transducer.

A system such as the system 200 may thus be utilized for freezing an organic object. With such system, the process of crystal growth and growth interruption is cyclically repeated from the start of freezing to reaching the target temperature in the centre of the object to be frozen. In some examples, that is −18° C. The prevention of crystal growth with a mechanical wave in the product reduces the shear force thereby enabling mechanical processing of frozen objects with less effort and without defrosting them. Thus, the ice crystal growth controlled by an alternating magnetic field enables providing the above-described effects even in case of slow freezing, which inevitably takes place when freezing large-size objects, such as over 200 mm thick, that may be packaged into cardboard or plastic packaging, in freezing equipment at temperatures close to the required final object freezing temperature and at a low heat exchange rate that may be due to other causes.

Figure 3:
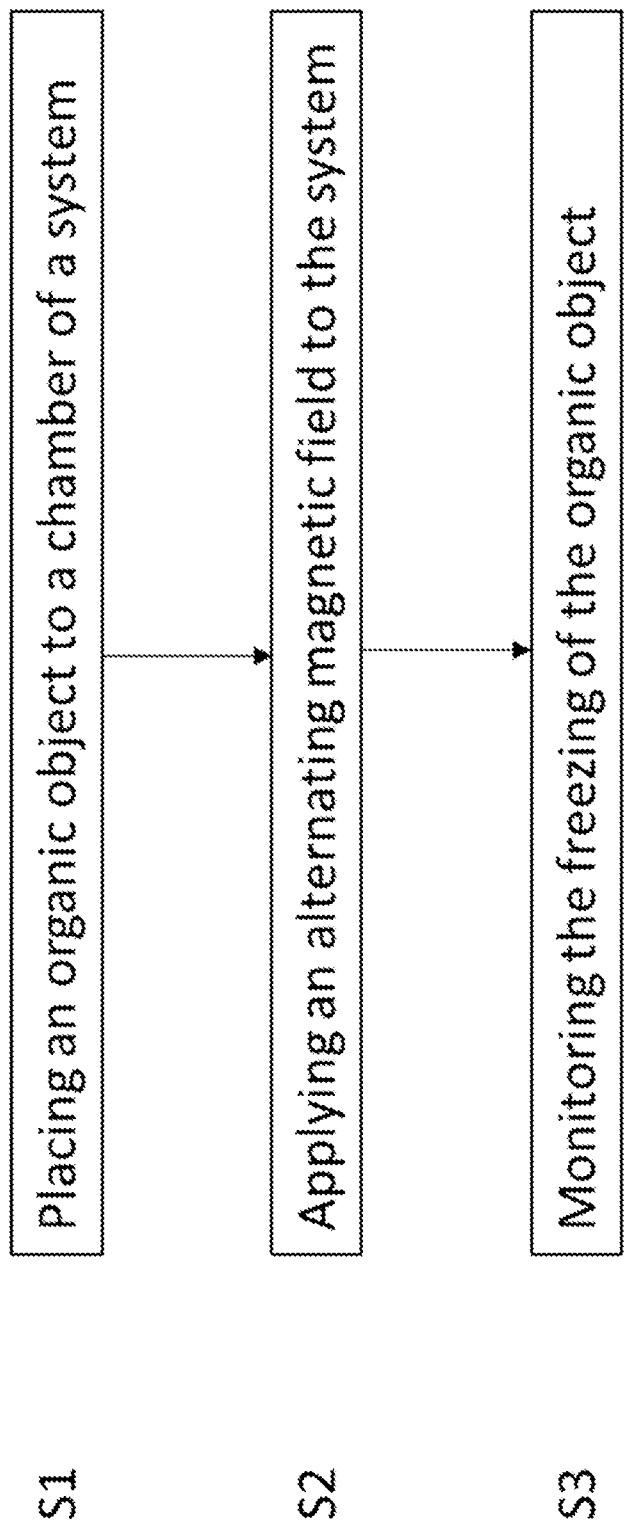
FIG. 3 illustrates an exemplary embodiment of freezing an organic object using the device.

FIG. 3 illustrates and exemplary embodiment of freezing an organic object using the system described above. First, in S1, the organic object to be frozen is placed within a chamber of a system such as the system 200. Then, in S2, the alternating magnetic field is applied to the system. Next, in S3, the process of freezing the organic object is monitored. This may be achieved for example by placing a multipoint thermometer inside the sample to measure the temperature at points located at different depths from the surface of the organic object to be frozen. To prevent the influence of magnetic fields on the thermometer readings, the alternating magnetic field may be deactivated for the duration of the measurement. Alternatively, or additionally, the process of freezing the organic object may be monitored by measuring the sonic wave propagation rate in a frozen sample of the organic object against a reference frozen sample to compare the time of wave travel through the frozen sample of the organic object and the reference sample and to make sure that the sonic wave propagation rate in these samples is constant and equal. To prevent the influence of magnetic fields on the measurement of wave propagation rate in the sample, the alternating magnetic field may be deactivated for the duration of the measurement.

Figure 4:
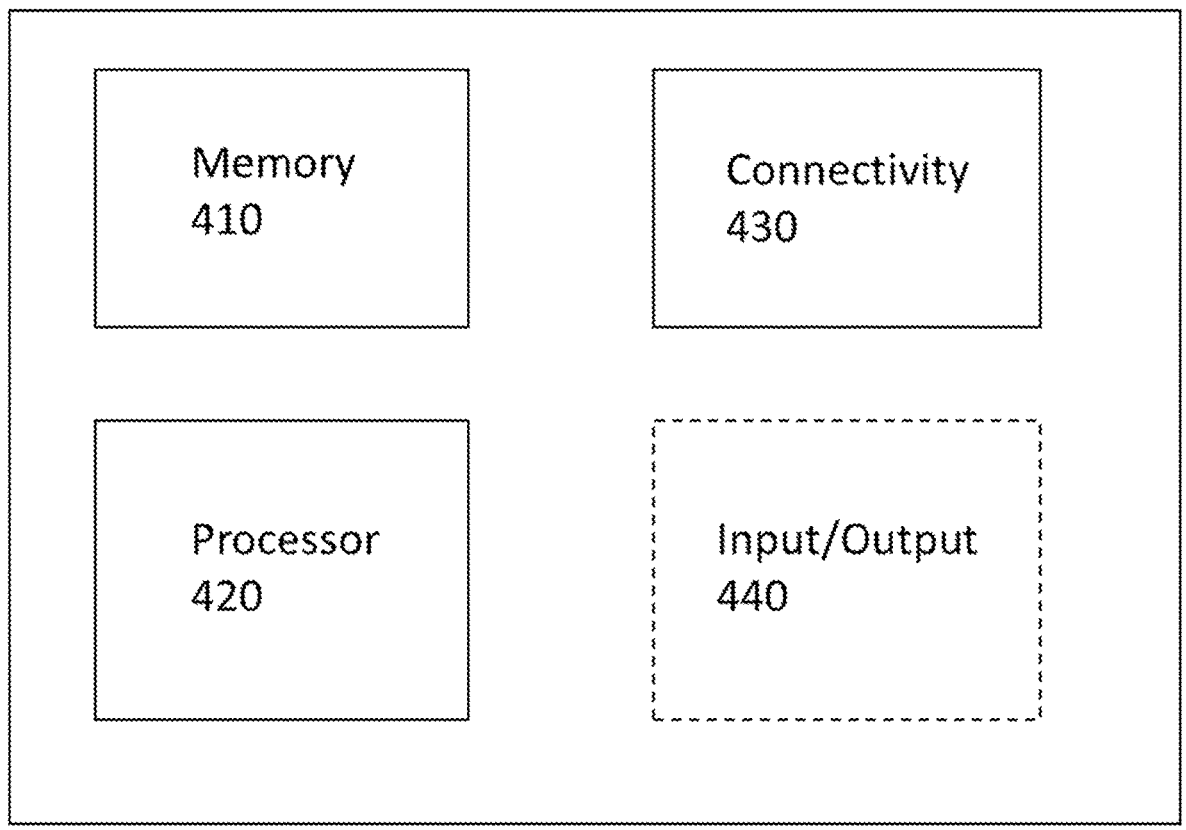
FIG. 4 illustrates exemplary embodiment of a computing apparatus.

FIG. 4 is an example of a computing apparatus that may be comprised in or connected to the device 100 illustrated in FIG. 1. The computing apparatus 400 may be, for example, a circuitry or a chipset applicable to a device to realize the described embodiments. The apparatus 400 may alternatively be an electronic device comprising one or more electronic circuitries. The apparatus 400 may comprise a memory 410 that may be implemented using any suitable data storage technology, such as semiconductor-based memory devices, flash memory, magnetic memory devices and systems, optical memory devices and systems, fixed memory and removable memory. The apparatus 400 may also comprise a processor 420 that comprises circuitry capable of executing computer program commands.

The apparatus 400 may further comprise a connectivity circuitry 430 that enables the apparatus to connect to a network which may be wired or wireless, such as a wireless local area network or a cellular wireless network. The apparatus 400 may optionally further comprise an input/output unit 440 that is configured to enable interaction between the apparatus and a user. The input/output unit 440 may enable text input, touch input, displaying of graphics, voice input and audio output for example.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. The above-described embodiments of the circuitry may also be considered as embodiments that provide means for carrying out the embodiments of the methods or processes described in this document.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), tensor processing units (TPUs), processors, controllers, micro-controllers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium.

Figure 5:
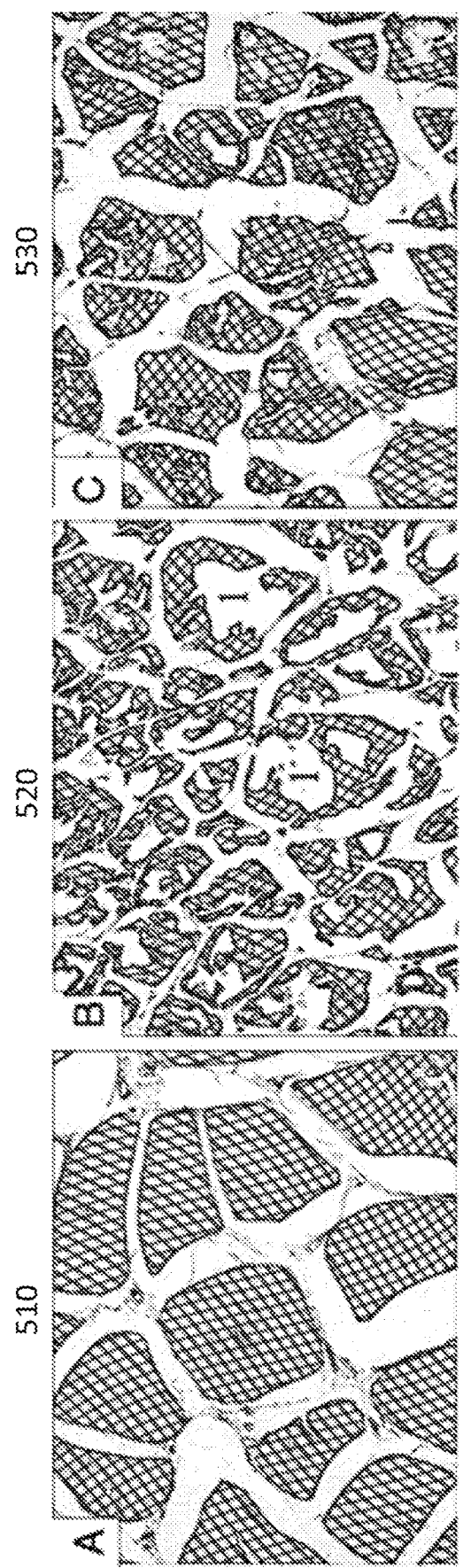
FIG. 5 illustrates an example of salmon frozen with the present invention.

FIG. 5 illustrates examples of a salmon that is frozen. Salmon is an organic object and its structure, before freezing, is illustrated by fresh salmon 510. If the salmon is then frozen using individually quick-frozen, IQF, method, the structure of the salmon is then the structure 520. IQF is a method that prevents forming of large ice crystals in a cell. Yet, if the salmon is frozen using an exemplary embodiment described above, the structure of the salmon is the structure 530. As can be seen from the illustrations, the structure 530 is more alike the structure 510 of a fresh salmon that the structure 520 of IQF frozen salmon.

The invention claimed is:

1. A device for controllable growth of ice crystals inside an organic object during freezing, the device comprising
at least one transducer configured to trigger the growth of the ice crystals by causing mechanical elastic waves within the organic object, a control unit, a power supply and a modulator, wherein
the control unit causes magnetic fields to be emitted, by the at least one transducer, in a cyclical manner, so as to control the growth of the ice crystals, and
the control unit determines a carrier frequency, a modulation frequency, modulation boundaries and duty cycle, and sets them by utilizing the signal generator and the power supply; and
wherein a strength of the magnetic fields is determined by adjusting an output voltage provided by the power supply.

2. A device according to claim 1, wherein the magnetic fields is at least one of the following: an alternating bidirectional magnetic field, an alternating unidirectional magnetic field and/or a variable pseudo-rotating magnetic field with pulse width modulation.

3. A device according to claim 1, wherein the at least one transducer comprises additional transducers placed into the at least one transducer.

4. A device according to claim 1, wherein the device is connected to or comprises a computing apparatus.

5. A device according to claim 4, wherein the computing apparatus is caused to execute one or more algorithms for determining fields superposition and/or wherein the computing apparatus further stores data regarding types of signals suitable for different types of organic objects to be frozen.

6. A device according to claim 1, wherein at least one transducer has a mobile design to facilitate loading and maintenance.

7. The device of claim 1, wherein a temperature of the object is maintained at between 0 and −18° C. during the controllable growth of the ice crystals in the object.

8. The device of claim 1, wherein the carrier frequency is in a range of 1 KHz to 12 MHz.

9. The device of claim 1, wherein the magnetic fields emitted by the transducer are modulated in an infrasonic frequency range.

10. The device of claim 1, further comprising a Faraday cage around the transducer.

11. The device of claim 1, wherein the magnetic fields emitted by the transducer are modulated in a frequency range of 0.1 Hz to 80,000 Hz.

12. The device of claim 1, wherein the mechanical elastic waves within the organic object are directly caused by the magnetic fields.

13. The device of claim 1, wherein the magnetic fields emitted by the transducer are pseudo-rotated by a frequency modulation of a pulse width signal.

14. The device of claim 1, wherein the magnetic fields emitted by the transducer are alternating bidirectional magnetic fields.

15. The device of claim 1, wherein the magnetic fields emitted by the transducer are alternating unidirectional magnetic fields.

16. The device of claim 1, wherein the transducer is a magnetic coil surrounding the object.

17. A device for growth of ice crystals, comprising
a control unit;
a signal generator;
a transducer configured to surround an organic object and connected to the modulator;
a power supply powering the control unit, the signal generator and the transducer;
the transducer configured to cause mechanical elastic waves within the organic object so as to control a growth of the ice crystals within the organic object,
wherein the mechanical elastic waves are triggered by magnetic fields emitted by the transducer;

wherein the control unit sets a carrier frequency, a modulation frequency and duty cycle of the magnetic fields by utilizing the signal generator; and wherein an amplitude of the magnetic fields is determined by adjusting an output voltage provided by the power supply.

18. The device of claim 17, wherein the signal generator includes a modulator for up-shifting a waveform of the magnetic fields to the carrier frequency.

19. The device of claim 17, wherein the transducer is a magnetic coil that is round in cross-section.

20. The device of claim 17, wherein the transducer is a magnetic coil that is rectangular in cross-section.

21. The device of claim 17, wherein the control unit is configured to create the mechanical elastic waves of equal amplitude inside an entire volume of the organic object in order to control the growth of the ice crystals.

* * * * *